Dec. 17, 1940.   I. ILIEFF   2,225,116
VALVE MEMBER
Filed July 18, 1940
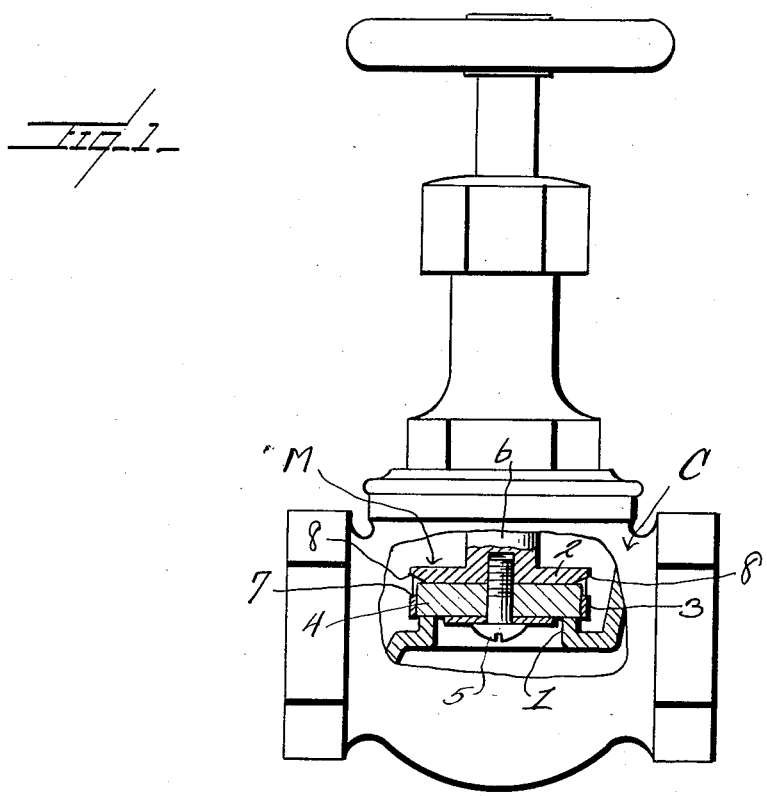
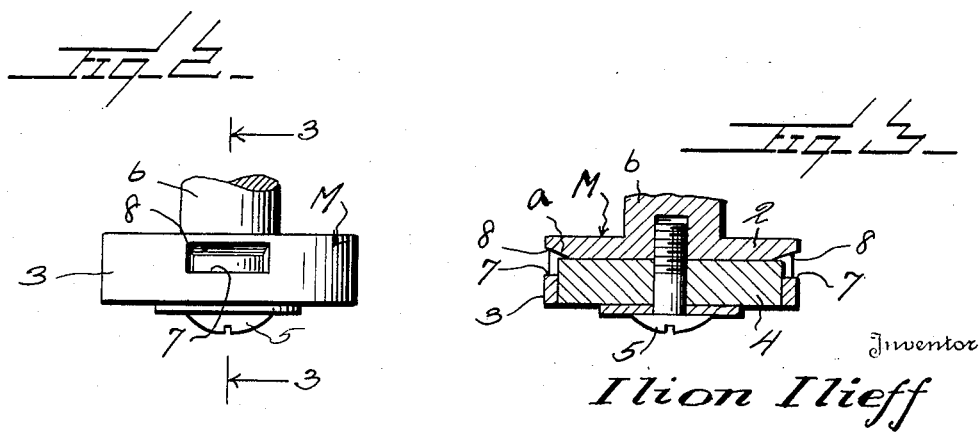
Inventor
Ilion Ilieff
By Watson E. Coleman
Attorney Patented Dec. 17, 1940

2,225,116

UNITED STATES PATENT OFFICE 2,225,116

VALVE MEMBER

Ilion Ilieff, Tarrytown, N. Y.

Application July 18, 1940, Serial No. 346,225

1 Claim. (Cl. 251—160)

This invention relates to a valve member and has relation more particularly to a member of this kind of a cup-shape in which is snugly fitted a valve washer or disk, and it is an object of the invention to provide a valve member of this character with means whereby the valve washer or disk can be readily and conveniently removed for replacement or for such other purposes as desired.

The invention consists in the details of construction and in the combination and arrangement of the several parts of my improved valve member whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:

Figure 1 is a view partly in elevation and partly in section illustrating a valve structure comprising a valve member constructed in accordance with an embodiment of my invention;

Figure 2 is a fragmentary view in elevation of the valve member unapplied;

Figure 3 is a sectional view taken substantially on the line 3—3 of Figure 2.

As disclosed in the accompanying drawing, C denotes a conventional type of valve casing provided therein with the usual valve seat 1. Coacting with this valve seat 1 in a well known manner is a valve member M. This member M is cup-shaped whereby is provided a back wall 2 provided at its periphery with a surrounding side wall 3. Snugly fitting within the member M is a valve washer or disk 4 which, in the present embodiment of the invention, is held in applied position by a holding stud 5 which is disposed axially through the washer or disk 4 and threads through the back wall 2 of the valve member M and into the stem 6 for said member M.

With the general type of valves of the character such as herein disclosed, when it is desired to remove a valve washer or disk 4 for replacement or otherwise as may be desired, considerable difficulty is encountered in doing so. In many cases it is required that the washer or disk 4 be chiseled out. By the structure of the valve member as herein embodied the washer or disk 4 can be easily forced out from the member M.

As herein embodied the side wall 3 of the valve member M is provided with a plurality of circumferentially disposed slots 7. These slots 7 are preferably two in number and diametrically opposed although I do not wish to be understood as limiting myself in this respect. Each of these slots 7 is positioned immediately adjacent to the inner face of the back wall 2 of the member M and the portion of the back wall 2 which constitutes the inner margin of the slot 7, is disposed as at 8 on an inwardly and upwardly directed bevel, said beveled face 8 terminating inwardly of the inner face of the adjacent portion of the side wall 3.

As is clearly illustrated in Figure 3 of the drawing, a marginal portion of the applied washer or disk 4 extends outwardly beyond the inner end of a beveled portion 8 whereby is provided a notch $a$ in which may be readily engaged a suitable instrument for readily forcing the applied washer or disk 4 out from within the member M. The bevel 8 also facilitates the effective engagement of the tool or instrument with the washer or disk 4 as the contact of such an instrument with the bevel 8 will guide said instrument within the notch $a$.

In removing the washer or disk 4 any suitable tool or instrument may be used, such as a screw driver, nail or the like which can be readily inserted through a slot 7.

From the foregoing description it is thought to be obvious that a valve member constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

A cup-shaped valve member adapted to snugly receive a valve disk, said valve member having a rear wall and a surrounding side wall, said side wall being provided with an elongated opening adjacent to the rear wall, the top marginal edge of the opening immediately adjacent to the rear wall being disposed on an inward and downward bevel terminating at a line inwardly from and above the top marginal edge of the valve disk.

ILION ILIEFF.